UNITED STATES PATENT OFFICE.

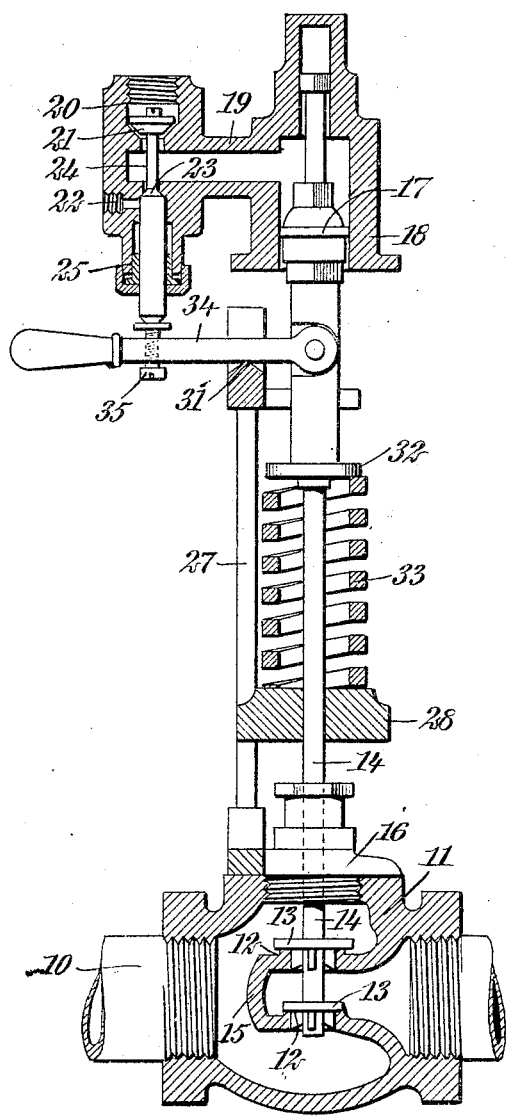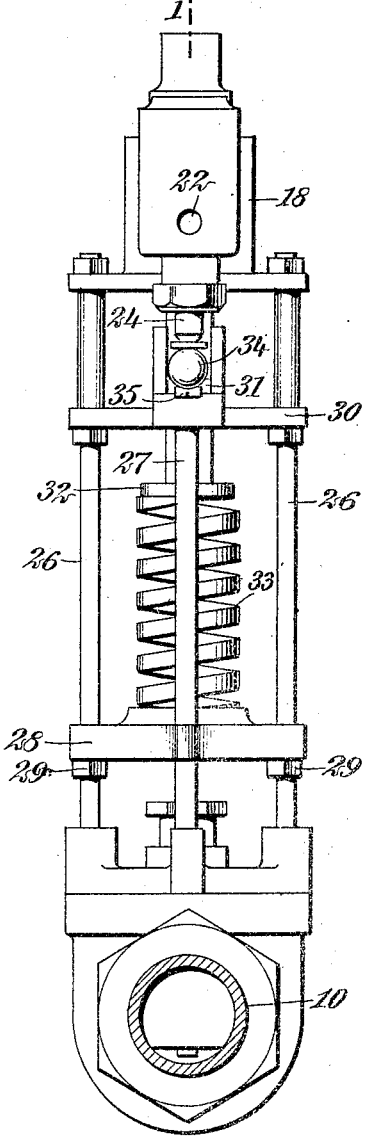

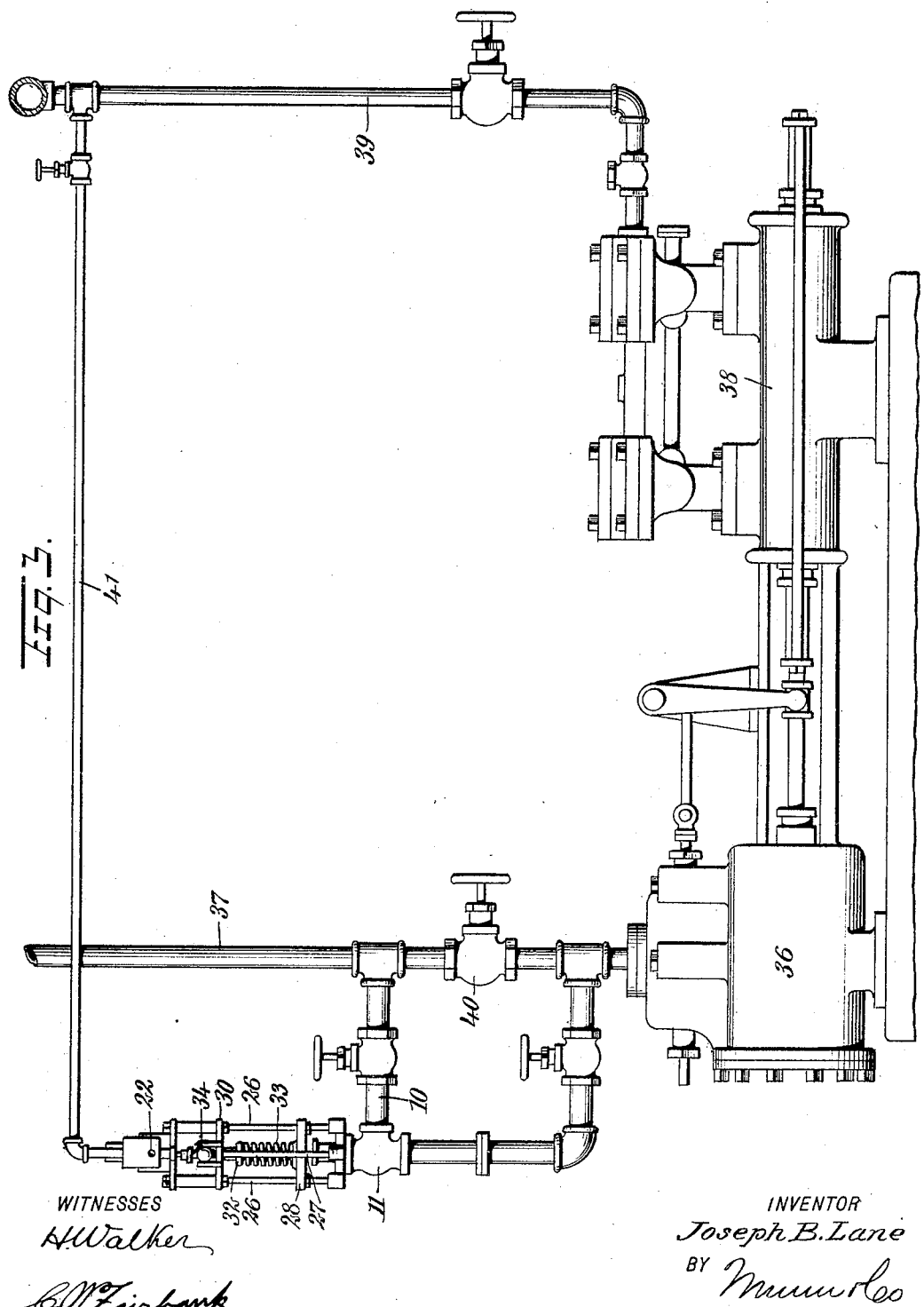

JOSEPH BEAMISH LANE, OF GLENWOOD LANDING, NEW YORK.

AUTOMATIC STARTING-VALVE.

No. 902,417.  Specification of Letters Patent.  Patented Oct. 27, 1908.

Application filed May 5, 1908. Serial No. 430,904.

*To all whom it may concern:*

Be it known that I, JOSEPH B. LANE, a citizen of the United States, and a resident of Glenwood Landing, in the county of Nassau and State of New York, have invented a new and Improved Automatic Starting-Valve, of which the following is a full, clear, and exact description.

This invention relates to certain improvements in mechanism for controlling the pressure in conduits, containers and the like, and more particularly relates to that type of controller in which the flow of fluid through one conduit, for instance, a motive fluid for operating a pump, is controlled by the pressure in a separate conduit or container, for instance, air compressed by a pump operated by said motive fluid. The controller may be used in various different systems and mechanisms where it is desired to maintain a substantially uniform fluid pressure.

Reference is to be had to the accompanying drawings, forming a part of this specification, in which similar characters of reference indicate corresponding parts in all the figures, and in which Figure 1 is a section through one form of device embodying my invention; Fig. 2 is an end view thereof; and Fig. 3 is a side elevation of a portion of a pumping system, illustrating one use to which my improved valve may be put.

In the specific construction illustrated in the accompanying drawings, I provide a conduit 10, having a balanced valve for controlling the flow of fluid therethrough. This valve preferably comprises a valve casing 11, having two valve seats 12 and two valves 13 mounted on the same valve stem 14, for simultaneously engaging with both seats. The valve seats and the connecting partition 15 carrying the same, are so arranged that one of the valves opens toward the supply end of the conduit and the other opens toward the delivery end, so that very little force is required to open the valve, even though the fluid in the conduit be under very high pressure. The valve casing is closed at one side by a threaded plug 16, having a gland or packing surrounding the valve stem or rod 14, which extends to the exterior of the casing.

The valve rod 14 carries at its outer or free end a piston 17, operating in a small cylinder 18, one end of the piston being exposed to the atmosphere and the opposite side of the piston being exposed to the pressure of the system in connection with which my improved controller is used. The cylinder 18 is formed integral with an inlet 20, controlled by an outwardly-opening valve 21, and an outlet 22 controlled by an outwardly-opening valve 23. The valves 21 and 23 are both carried by a valve stem 24, which extends through a packing 25 to the exterior of the device.

The valve casing 11 is operatively connected to the casting forming the cylinder 18 by a suitable framework, including two standards 26, each secured at one end to the plug 16 of the valve casing 11, and connected at its upper end to the sides of the cylinder 18. In addition to the standards 26, I provide a third standard 27, which is also connected to the plug 11, but terminates short of the cylinder. The three standards are connected together adjacent the plug by a platform or base 28, movable longitudinally of the standards and normally held against movement by suitable nuts 29 threaded on said standards. The standards are connected together adjacent the upper end by a suitable transverse frame 30, including a fulcrum 31, in alinement with the end of the standard 27. The valve stem 14 extends through the fulcrum or base 28, and carries a collar 32. Between the collar and the base and engaging with both, I mount a coil spring 33, which normally tends to lift the balanced valve from its seat and force the piston into the cylinder. Above the collar, I provide a lever 34, adapted to rest on the fulcrum 31, and adapted to also engage with the end of the valve stem 24. The lever may, if desired, carry a regulating stop or contact 35 for controlling the engagement with said valve stem.

To illustrate more clearly the operation of my improved valve, I have shown in Fig. 3, a portion of a pumping system having my valve used in connection therewith. The pumping system includes a steam cylinder 36, having a main steam pipe 37 delivering thereto. The steam engine is directly connected to a pump or compressor 38, and the latter delivers the compressed fluid through a conduit 39. The main steam pipe 37 is provided with a controlling valve 40, and extending around this valve is a by-pass including my improved valve. The compressed fluid delivery conduit 39 is connected to the inlet 20 of the valve by a conduit 41.

To set the valve the operator pushes upward on the lever 34 to open the valve 21 and close the valve 23. The pressure in the system is transmitted through the conduit 41 to the piston 17 and operates in opposition to the spring 33 to hold the valve 13 to its seat. Through the fulcrum and the lever 34, it also holds the valve 23 closed and the valve 21 open. If, for any reason, the pressure in the system should drop below the predetermined limit, the spring 33 will open the valve 13 and start the pump, the valve 21 will close, and the valve 23 will open. This shuts off communication between the pressure system and the piston 17, and the pump will operate continuously until the operator resets the valve. The valve operates automatically to start the pump and will keep up the pressure until the cause of the drop in pressure or the trouble on the main pump, is attended to.

The valve is especially designed for use with an auxiliary pump which is normally out of operation and only comes into operation automatically upon the failure of the main pump.

Having thus described my invention, I claim as new and desire to secure by Letters Patent:

1. In combination, a conduit, a valve for controlling the same, means for retaining a fluid under pressure, the pressure being dependent on the flow of fluid through said conduit, a piston exposed to said fluid under pressure and operatively connected to said valve to hold the latter in closed position when said fluid exceeds a predetermined limit, and a valve for terminating the application of fluid pressure to the piston upon the opening of said first mentioned valve.

2. In combination, a conduit, a valve for controlling the same, means for retaining a fluid under pressure, the pressure being dependent on the flow of fluid through said conduit, a piston exposed to said fluid under pressure and operatively connected to said valve to hold the latter in closed position when said fluid exceeds a predetermined limit, and a valve for opening communication between said piston and the outer atmosphere upon the opening of the for mentioned valve.

3. In combination, a conduit, a valve for controlling the same, means for retaining a fluid under pressure, the pressure being dependent on the flow of fluid through said conduit, a piston operatively connected to said valve and exposed to said fluid under pressure, and a valve operated by said piston and controlling the application of fluid pressure thereto.

4. In combination, a conduit, a valve for controlling the same, means for retaining a fluid under pressure, the pressure being dependent on the flow of fluid through said conduit, a piston operatively connected to said valve and exposed to said fluid under pressure, a valve for controlling the application of fluid pressure to the piston, a lever having pivotal connection with said piston, a stationary fulcrum, and means connecting the opposite ends of said lever to said last mentioned valve.

5. In combination, a conduit, a valve for controlling the same, means for retaining a fluid under pressure, the pressure being dependent on the flow of fluid through said conduit, a piston operatively connected to said valve and exposed to said fluid under pressure, a valve for controlling the application of fluid pressure to the piston, a standard adjacent the first-mentioned valve, a spring acting in opposition to said piston, a fulcrum carried by said standard, a lever having pivotal connection with said piston and in engagement with said fulcrum, and means connecting the second-mentioned valve to said lever.

In testimony whereof I have signed my name to this specification in the presence of two subscribing witnesses.

JOSEPH BEAMISH LANE.

Witnesses:
HATTIE A. TRESCOTT,
DANIEL P. WANZOR.